United States Patent [19]
Kühling et al.

[11] Patent Number: 5,856,012
[45] Date of Patent: Jan. 5, 1999

[54] PROCESS FOR THE PRODUCTION OF MULTILAYER PLASTIC SHEETS

[75] Inventors: Steffen Kühling, Meerbusch; Hartmut Löwer, Krefeld; Siegfried Anders, Köln; Jürgen Kirsch, Leverkusen, all of Germany; Werner Verhoeven, Kalmthout, Belgium

[73] Assignee: Bayer AG, Leverkusen, Germany

[21] Appl. No.: 514,443

[22] Filed: Aug. 11, 1995

Related U.S. Application Data

[63] Continuation of Ser. No. 318,185, Oct. 9, 1994, abandoned.

[30] Foreign Application Priority Data

Oct. 18, 1993 [DE] Germany ............... 43 35 440.8

[51] Int. Cl.$^6$ ................................... B32B 27/36
[52] U.S. Cl. ................ 428/412; 428/334; 524/86; 524/91; 524/544
[58] Field of Search ................ 264/171, 176.1, 264/177.17, 141, 210.6; 425/131.1, 133.5, 467; 428/412, 334; 524/86, 91, 94, 544

[56] References Cited

U.S. PATENT DOCUMENTS

| | | | |
|---|---|---|---|
| 4,185,009 | 1/1980 | Idel et al. | 524/91 |
| 4,533,510 | 8/1985 | Nissel | 264/171 |
| 4,540,622 | 9/1985 | Brunion et al. | 428/216 |
| 4,576,870 | 3/1986 | Liebler et al. | 428/515 |
| 4,707,393 | 11/1987 | Vetter | 428/178 |
| 4,788,088 | 11/1988 | Kohl | 425/34.5 |
| 4,812,498 | 3/1989 | Nakahara et al. | 524/91 |
| 4,892,700 | 1/1990 | Guerra et al. | 264/510 |
| 4,944,427 | 7/1990 | Yamada et al. | 220/406 |
| 4,994,229 | 2/1991 | Flecknoe | 264/522 |
| 5,001,177 | 3/1991 | Winfried et al. | 524/86 |
| 5,098,790 | 3/1992 | Diemunsch et al. | |
| 5,108,835 | 4/1992 | Hahnsen et al. | 428/334 |
| 5,445,872 | 8/1995 | Suhadolnik et al. | |

FOREIGN PATENT DOCUMENTS

| | | |
|---|---|---|
| 0 110 221 | 6/1984 | European Pat. Off. . |
| 0110238 | 6/1984 | European Pat. Off. . |
| 0 247 480 | 12/1987 | European Pat. Off. . |
| 0247480 | 12/1987 | European Pat. Off. . |
| 0 320 632 | 6/1989 | European Pat. Off. . |
| 0 359 622 | 3/1990 | European Pat. Off. . |
| 0 494 601 | 7/1992 | European Pat. Off. . |
| 0 649 724 | 4/1995 | European Pat. Off. . |
| 2832676 | 2/1980 | Germany . |
| 3312611 | 10/1984 | Germany . |
| 2028228 | 3/1980 | United Kingdom . |
| 2 290 745 | 10/1996 | United Kingdom . |

*Primary Examiner*—Merrick Dixon
*Attorney, Agent, or Firm*—Connolly and Hutz

[57] ABSTRACT

The invention relates to a process for the production of multilayer plastic sheets from special branched polycarbonates.

6 Claims, 1 Drawing Sheet

PROCESS FOR THE PRODUCTION OF MULTILAYER PLASTIC SHEETS

This application is a continuation of application Ser. No. 08/318,185 filed on Oct. 5, 1994, now abandoned.

FIELD OF THE INVENTION

This invention relates to a process for the production of multilayer plastic sheets consisting of a core layer and at least one outer layer containing 1% by weight to 15% by weight and preferably 1% by weight to 8% by weight of UV absorbers by co-extrusion of branched Si-free polycarbonates of 2,2-bis-(4-hydroxyphenyl)-propane, characterized in that the branched polycarbonate has an weight average molecular weight ($M_w$) of 27,000 to 29,500 and preferably of 28,000 to 29,000.

The characterizing $M_w$'s correspond to relative viscosities (as measured at 25° C. on a 0.5% solution in $CH_2Cl_2$) of 1.27 to 1.295 and 1.28 to 1.29, respectively.

The $M_w$'s may be measured not only via the relative viscosity, but also by determination of the molecular weight by light scattering.

BACKGROUND AND PRIOR ART

EP-OS 0 247 480 describes plastic sheets of the type in question in which the branched polycarbonate preferably has an $M_w$ of 20,000 to 40,000.

For example, a branched polycarbonate is used which has a $\eta_{rel}$ of 1.32 (as measured at 25° C. on a 0.5% solution in $CH_2Cl_2$), corresponding to an $M_w$ of 32,000.

In addition, in the examination proceedings on EP-OS 0 247 480, multilayer plastic sheets of branched polycarbonate with an $M_w$ of 30,000 and a $\eta_{rel}$ of 1.31 were subsequently filed as Examples (communication dated 19.08.1992).

U.S. Pat. No. 5,108,835 also describes multilayer plastic sheets. In this case, however, only the core layer contains branched polycarbonate (see Example II.2.3, column 11 of U.S. Pat. No. 5,108,835). The branched polycarbonate used again has an $M_w$ of 30,000 and a $\eta_{rel}$ of 1.31 (Example I.2, column 10 of U.S. Pat. No. 5,108,835).

EP-320 632 also describes multilayer plastic sheets of branched polycarbonates (see, for example, page 4, Table of EP-320 632).

However, general molecular weights of 10,000 to 200,000 are only mentioned in reference to the polydiorganosiloxane/polycarbonate block copolymers (page 6, lines 42/43 of EP-320 632). The polycarbonate used by way of Example has a $\eta_{rel}$ of 1.31.

DE-OS 3 414 116 and U.S. Pat. No. 4,600,632 describe UV-stabilized polycarbonate mouldings produced from polydiorganosiloxane/polycarbonate block copolymers.

U.S. Pat. No. 5,137,949 describes multilayer plastic sheets of which the UV-stabilized layers consist of polydiorganosiloxane/polycarbonate block copolymers.

EP-416 404 describes UV-stabilized branched polycarbonates of special diphenols (page 7, lines 14–21 of the EP and page 11, last paragraph of the EP).

It is mentioned (page 13, line 17) that polycarbonates of the type in question can be used for the production of sheets and multilayer sheets.

SUMMARY OF THE INVENTION

It has now been found that evaporation of the UV absorber decreases beyond an average molecular weight $M_w$ of <30,000 so that, by keeping to a certain molecular weight range of the branched polycarbonate, evaporation of the UV absorber is negligible, even in the event of prolonged co-extrusion of multilayer sheets, and has no effect on the favourable mechanical properties of the resulting sheet. This is achieved through the choice of the claimed molecular weight range.

DESCRIPTION OF THE PREFERRED EMBODIMENTS

Figure 1:
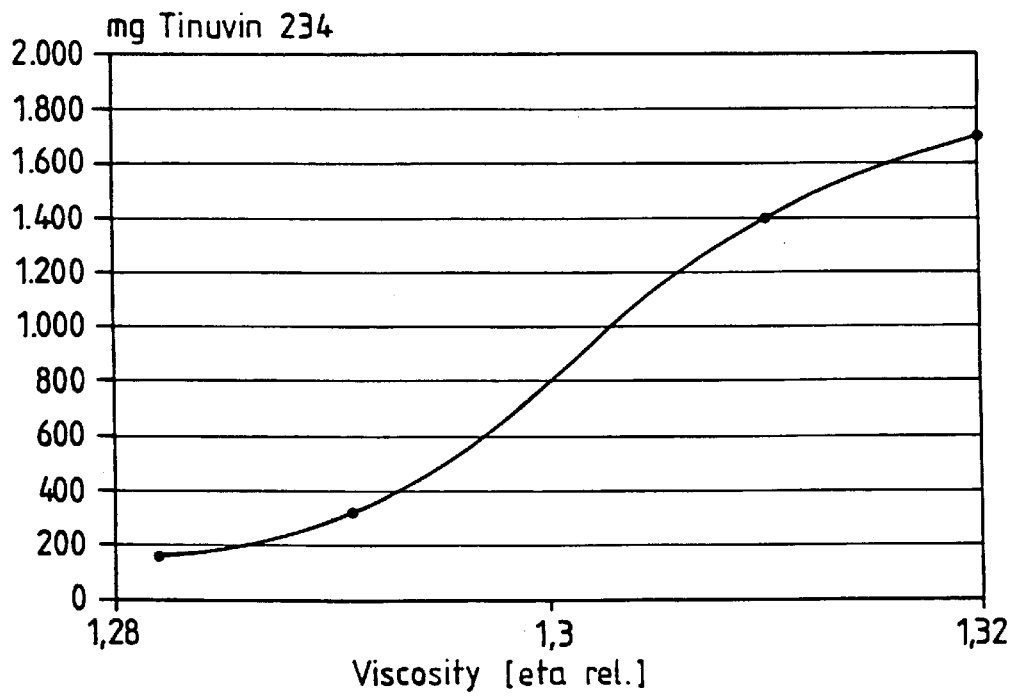
FIG. 1 is a plot of the quantity (mg) of the UV absorber Tinuvan 234 recovered by evaporation after 8 hr of extrusion vrs. the viscosity of the polycarbonate (relative viscosity at 25 degrees C. in 0.5% $CH_2Cl_2$).
Figure 2:
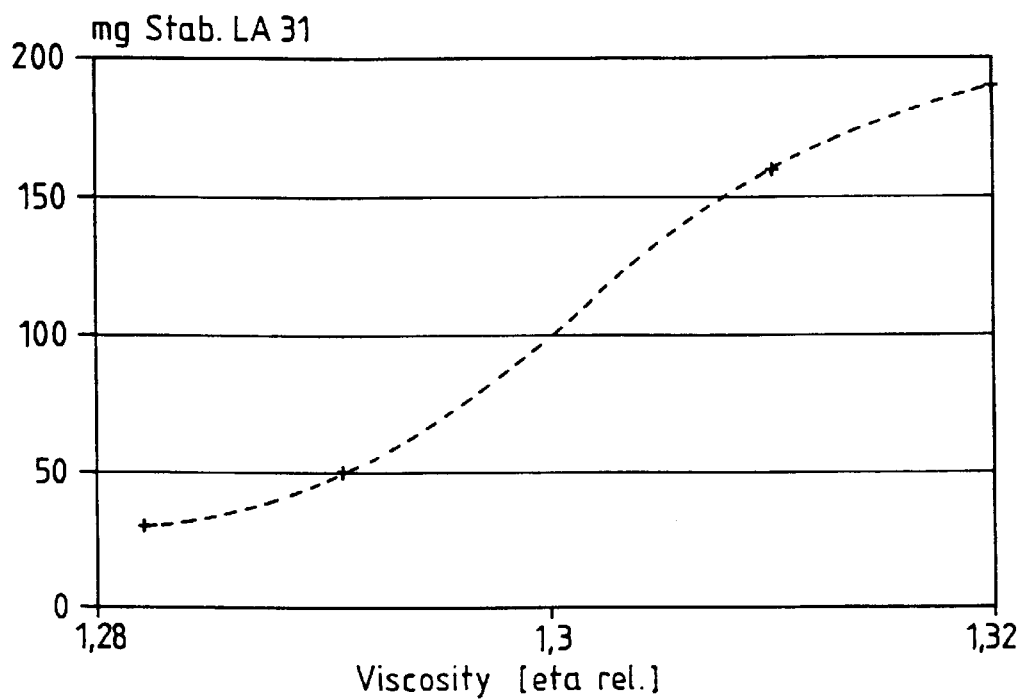
FIG. 2 is a plot of the quantity (mg) of the UV stabilizer LA 31 recovered by evaporation after 8 hr of extrusion vrs. the viscosity of the polycarbonate (relative viscosity at 25 degrees C. in 0.5% $CH_2Cl_2$).

Another factor which has to be taken into account is that excessively low molecular weights of the branched polycarbonates, i.e. of the order of <25,000, result in excessively low melting stability for certain applications of the sheets.

Si-free (silicon-free) polycarbonates suitable for the purposes of the invention are the polymers obtainable in known manner from bisphenol A, carbonate donors, branching agents and chain terminators, which are preferably produced in the melt using diphenyl carbonate or by the interfacial process using phosgene (see, for example, DE-OS 1 570 533 and US-CIP-Re 27 682).

Suitable branching agents are those containing three or four or more than four functional groups, particularly those containing three or more than three phenolic hydroxyl groups, which are normally used in quantities of 0.05 mol-% to 2 mol-%, based on the bisphenol A used. Some of the branching agents which may used are phlorogucinol, 4,6-dimethyl-2,3,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2, 4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane, 1,4-bis-(4', 4"-dihydroxytriphenyl)-methyl)-benzene, $\alpha,\alpha',\alpha"$-tris-(4-hydroxyphenyl)-1,3,5-triisopropylbenzene and, more particularly, 3,3-bis-(4-hydroxy-3-methylphenyl)-2-oxo-2, 3-dihydroindole, 1,4-bis-(4,4-dihydroxytriphenylmethyl)-benzene and 3,3-bis-(4-hydroxyphenyl)-2-oxo-2,3-dihydroindole.

Other possible branching agents are 2,4-dihydroxybenzoic acid, trimesic acid and cyanuric chloride.

Suitable chain terminators are monophenols, such as phenol itself, p-tert.butylphenol, p-tert.octylphenol, p-nonylphenol, p-chlorophenol and p-cresol.

In the interfacial process, the quantity of chain terminator required to obtain the molecular weight range according to the invention of 27,000 to 29,500 is normally 2 to 4 mol-% of chain terminator, based on the molar quantity of bisphenol A used.

Where the transesterification process is used for production, the quantity of chain terminator required is measured by using the carbonic acid diester, for example diphenyl carbonate, in excess in relation to the bisphenol A in dependence upon the distillation columns used (typically 102 to 108 mols of diphenyl carbonate to 100 mols of bisphenol A).

Other carbonate donors besides diphenyl carbonate or phosgene are other carbonic acid diesters, such as dimethyl carbonate and diethyl carbonate.

Suitable UV absorbers are, in particular, those corresponding to formulae (I):

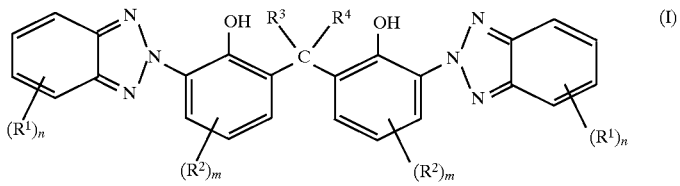

(I)

in which $R^1$ and $R^2$ may be the same or different and represent H, halogen, $C_{1-10}$ alkyl, $C_{5-10}$ cycloalkyl, $C_{7-13}$ aralkyl, $C_{6}$-aryl, —O—$R^5$ or

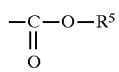

where $R^5$=H or $C_{1-4}$ alkyl, $R^3$ and $R^4$ may also be the same or different and represent H, $C_{1-4}$ alkyl, $C_{5-6}$ cycloalkyl, benzyl or $C_{6-14}$ aryl, m=1, 2 or 3 and n=1, 2, 3 or 4, and (II):

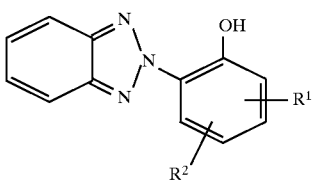

(II)

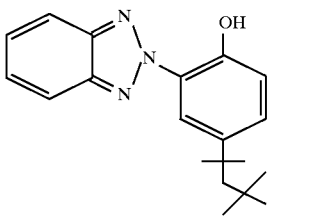

(IIa)

2-(2'-hydroxy-4'-tert. octylphenyl)-benzotriazole or

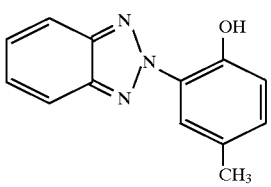

(IIb)

2-(2'-hydroxy-4'-methyl-phenyl)-benzotriazole in which $R^1$ and $R^2$ may be the same or different and represent $C_{1-15}$ alkyl radicals or aralkyl radicals, such as tert.octyl or methyl.

The UV absorbers are incorporated in the branched polycarbonates in known manner by mixing polycarbonate granules with the UV absorbers and extruding the resulting mixture or by mixing solutions of the polycarbonates, for example in $CH_2Cl_2$, with solutions of the UV absorbers, for example in acetone, and subsequently evaporating the solvents in known manner.

Multilayer plastic sheets are both solid sheets and, in particular, double-walled sheets; one or even both sides of the plastic sheets may be provided with the layers containing UV absorber.

The particular core layer of the plastic sheets according to the invention may of course also contain a basic quantity of UV stabilizer, i.e. for example 0.1% by weight to 0.5% by weight, based on the weight of the core layer.

The thickness of the plastic sheets derives from a 0.5 mm to 16 mm thick core layer and at least one 10 μm to 50 μm thick outer layer containing UV absorber.

Co-extrusion as such is known from the literature (see, for example, EP-110 221 and EP-110 238).

In the present case, the following procedure is preferably adopted:

An extruder for producing the core layer and further extruders for each outer layer are connected to a co-extrusion adapter. The adapter is designed in such a way that the melts forming the outer layers are applied as thin layers to the melt of the core layer and adhere thereto. The multilayer melt strand thus produced is then brought into the required shape (sheet or multilayer sheet) in the subsequently closed die. The melt is then cooled in known manner under controlled conditions by calendering (sheets) or vacuum calibration (multilayer sheets) and subsequently cut to length. The calibration or calendering stages may optionally be followed by a conditioning oven to eliminate stresses.

Accordingly, the process according to the invention has the advantage that the choice of the special reaction parameters, more particularly the special molecular weights of the branched polycarbonates, eliminates the need for an additional outer layer free from UV absorber where it is desired to use low molecular weight, readily volatile UV absorbers.

The process according to the invention may be carried out both discontinuously and, above all, continuously over a period of at least 5 hours and preferably at least 8 hours.

A measuring process for determining the mechanical strength of multilayer sheets is a penetration test adapted for multilayer sheets. In this test, a 5 mm diameter falling mandrel weighing 36 kg which is centered between the dividers penetrates the multilayer sheet and the force, energy consumption and deformation up to penetration are measured. An energy consumption of <2 J, a fracture force of around 0.4 kN and a deformation of 9 mm are measured for 10 mm multilayer sheets with a surface of 0.8 mm and adequate mechanical properties. If the energy consumption value is <2 J, the mechanical strength of the multilayer sheet is inadequate.

In addition, the multilayer plastic sheets obtainable by the process according to the invention have excellent surfaces which are free from deposits, evaporation marks or efflorescence stains.

In addition to the UV absorbers, typical additives, for example other stabilizers, flow aids, mold release agents, flameproofing agents, pigments, fine-particle minerals and the like, may be incorporated in the usual quantities in the branched polycarbonates to be used in accordance with the invention.

The additives in question are preferably added to the polycarbonate in conventional units.

The multilayer plastic sheets produced by the process according to the invention are used in particular as glazing and structural elements in house building and in the horticultural sector.

EXAMPLES

Example 1

Multilayer sheets are extruded using a branched (0.3 mol-% of 3,3-bis-(4-hydroxy-3-methylphenyl)-2-oxo-2,3-dihydroindole) polycarbonate with a molecular weight $M_w$ of 28,200 ($\eta_{rel}$=1.282).

A 40 μm thick UV absorber-containing polycarbonate layer of the same branched polycarbonate is applied by co-extrusion, the UV absorber used corresponding to formula (I) with $R^1=R^3=R^4=H$ and $R^2$=tert.octyl. The UV absorber is used in a quantity of 7% by weight, based on the weight of the 40 μm thick outer layer.

The machine used was a vented Reifenhäuser extruder with a screw diameter of 70 mm. Co-extrusion was carried out with a Storck extruder (30 mm screw). The die had a width of 350 mm, the divider height of the extruded sheet was 10 mm, the upper belt had a thickness of 0.2 mm. The extrusion parameters were as follows:

Rotational speed: 36 min./1

Current consumption: approx. 70 A

Screw pressure: 104 bar

Output: approx. 61 kg/h

Takeoff rate: 1.4 m/minute

Vacuum calibration: –0.2 bar

UV-stabilized multilayer sheets were extruded for 8 h under the extrusion conditions thus established. The surface of the multilayer sheets is excellent with hardly any sign of the so-called "plate out" effect. The machine was then switched off, the calibrator was opened and the coating formed was collected. A total of 30 mg of UV absorber was isolated.

Comparison Example 1

A multilayer sheet was extruded under the same conditions as in Example 1, except that the branched polycarbonate used had an average molecular weight $M_w$ of 31,000 ($\eta_{rel}$=1.310). After an extrusion time of 8 h, however, 160 mg of UV absorber were isolated and some white marks were visible on the surface of the sheet.

Example 2

The procedure was as in Example 1, except that the UV absorber used corresponded to formula (II) instead of formula (I) with

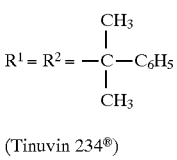

(Tinuvin 234®)

280 mg of UV absorber were isolated after an extrusion time of 8 hours.

Comparison Example 2

A multilayer sheet was extruded under the same conditions as in Example 2, except that the branched polycarbonate used had an average molecular weight $M_w$ of 31,000 ($\eta_{rel}$=1.310). On this occasion, however, 1400 mg of Tinuvin 234 were isolated after an extrusion time of 8 h.

Example 3

The procedure was as described in Example 1, except that the branched polycarbonate had a molecular weight $M_w$ of 29,100 ($\eta_{rel}$ 1.291). 50 mg of UV absorber were isolated after an extrusion time of 8 hours.

Example 4

The procedure was as in Example 2, except that the branched polycarbonate used had a molecular weight $M_w$ of 29,100 ($\eta_{rel}$ 1.291). 320 mg of UV absorber were isolated after an extrusion time of 8 hours.

Comparison Example 3

The procedure was as in Example 1, except that the branched polycarbonate had a molecular weight $M_w$ of 32,100 ($\eta_{rel}$ 1321). 160 mg of UV absorber were isolated after an extrusion time of 8 hours.

Comparison Example 4

A multilayer sheet was extruded under the same conditions as in Example 2, except that the branched polycarbonate used had an average molecular weight $M_w$ of 32,100 ($\eta_{rel}$ 1.321). On this occasion, however, 1700 mg of UV absorber (Tinuvin 234) were isolated after an extrusion time of 8 hours.

TABLE 1

Evaporation of UV absorber as a function of viscosity

| $\eta_{rel}$ | UV absorber | Quantity evaporated after extrusion for 8 h | Fracture energy on penetration [J] |
|---|---|---|---|
| 1.282 | Stab. LA 31 | 30 mg | 2.11 |
| 1.310 | Stab. LA 31 | 160 mg | 2.18 |
| 1.282 | Tin. 234 | 280 mg | 2.15 |
| 1.310 | Tin. 234 | 1400 mg | 2.16 |
| 1.291 | Stab. LA 31 | 50 mg | 2.13 |
| 1.291 | Tin. 234 | 320 mg | 2.13 |
| 1.321 | Stab. LA 31 | 190 mg | 2.20 |
| 1.321 | Tin. 234 | 1700 mg | 2.21 |

We claim:

1. A multilayer sheet obtained by coextrusion from silicon-free branched polycarbonate, comprising a core layer and at least one coextruded outer layer containing UV absorbers, the improvement which comprises coextruding said layers from silicon-free, branched polycarbonate of 2,2-bis-(4-hydroxyphenyl)-propane having a weight average molecular weight of from 27,000 to 29,500.

2. A sheet as claimed in claim 1, wherein said at least one outer layer contains 1–15% by weight of UV absorber.

3. A sheet as claimed in claim 1, wherein the weight average molecular weight of the silicon-free, branched polycarbonate of 2,2-bis-(4-hydroxyphenyl)-propane is from 28,000 to 29,000.

4. A sheet as claimed in claim 1, wherein the coextrusion is carried out in a continuous manner for at least 5 hours.

5. A sheet as claimed in claim 1, wherein the UV absorber has the structure of formula (II)

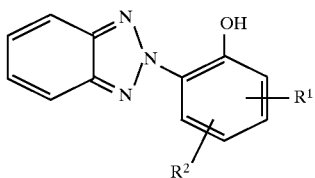

(II)

wherein $R^1$ and $R^2$ may be the same or different and represent $C_{1-15}$ alkyl or aralkyl radicals.

6. A sheet as claimed in claim 1, wherein the core layer is a double walled sheet.

* * * * *